United States Patent [19]

Matsuda et al.

[11] 4,186,240
[45] Jan. 29, 1980

[54] THERMOPLASTIC OLEFIN RESIN COMPOSITION AND LAMINATED FILM OR SHEET THEREOF

[75] Inventors: Akira Matsuda, Iwakuni; Tetsuo Tojo, Ohtake; Kazuo Iwata, Iwakuni, all of Japan

[73] Assignee: Mitsui Petrochemical Industries Ltd., Tokyo, Japan

[21] Appl. No.: 884,220

[22] Filed: Mar. 7, 1978

[30] Foreign Application Priority Data

Sep. 26, 1977 [JP] Japan .................. 52-114690
Sep. 27, 1977 [JP] Japan .................. 52-115088
Jan. 13, 1978 [JP] Japan .................. 53-1876

[51] Int. Cl.$^2$ ............................................ B32B 27/32
[52] U.S. Cl. .................................... 428/349; 525/240; 428/517; 428/519; 428/521; 428/523; 428/910
[58] Field of Search ............. 260/897 A; 428/512, 428/513, 515–517, 519, 521, 523, 910, 349

[56] References Cited

U.S. PATENT DOCUMENTS

| | | | |
|---|---|---|---|
| T714,056 | 4/1969 | Hall | 428/517 X |
| 3,202,528 | 8/1965 | James | 428/516 X |
| 3,280,220 | 10/1966 | Nelson | 260/897 A |
| 3,370,972 | 2/1968 | Nagel et al. | 428/516 X |
| 3,458,604 | 7/1969 | Palmer et al. | 260/897 A |
| 3,649,441 | 3/1972 | Strange et al. | 428/379 |
| 3,808,304 | 4/1974 | Schirmer | 260/897 A |
| 3,891,008 | 6/1975 | D'Entremont | 428/516 |
| 4,125,662 | 11/1978 | Weiner et al. | 428/516 |

*Primary Examiner*—Harold Ansher
*Attorney, Agent, or Firm*—Sherman & Shalloway

[57] ABSTRACT

A thermoplastic olefin resin composition composed of a blend of (i) 5 to 95% by weight, based on the weight of the blend, of a random copolymer consisting essentially of 55 to 85 mole% of propylene and 45 to 15 mole% of 1-butene and having a heat of fusion of 10 to 80 joules/g determined by differential thermal analysis using a differential scanning calorimeter, and (ii) 5 to 95% by weight, based on the weight of the blend, of an isotactic propylene resin containing 0 to 10 mole% of another α-olefin and having a melting point of 135° to 165° C. and a melt index, measured at 230° C., of 0.1 to 20; and a laminated olefin resin film or sheet thereof.

5 Claims, No Drawings

THERMOPLASTIC OLEFIN RESIN COMPOSITION AND LAMINATED FILM OR SHEET THEREOF

This invention relates to a thermoplastic olefin resin composition composed of a blend of (i) a random copolymer consisting essentially of propylene and 1-butene and (ii) an isotactic propylene resin having a melting point of 135° to 165° C. and a melt index (at 230° C.) of 0.1 to 20. The invention also relates to a laminated film or sheet having a laminated layer of the thermoplastic olefin resin composition. It further relates to the thermoplastic olefin resin composition in the form of a melt-shaped article.

When the resin composition of this invention comprises a major proportion of the random copolymer (i) of propylene and 1-butene, it has markedly improved antiblocking property and mechanical strength in addition to various other desirable properties such as superior transparency, superior low-temperature heat sealability and good low temperature shrinkability. Because of these improved properties, this resin composition is very useful as melt-shaped articles such as shrinkable packaging films or sheets, protective films or sheets, textile packaging films or sheets, and other general-purpose packaging films.

When the resin composition comprises a major proportion of the isotactic propylene resin (ii), it has remarkably improved transparency, resistance to whitening by impact and resistance to whitening by bending in addition to other desirable properties such as superior thermal stability, superior mechanical strength and hinge characteristics. Because of these improved properties, the resin composition is very useful as melt-shaped articles, for example various containers such as containers for edible oils and seasonings, containers for transporting liquids and containers for liquid detergents; vacuum-formed packs such as blister packs and skin packs; tapes having superior optical characteristics, general-purpose packaging films and sheets, and shrinkable packaging films and sheets; battery cases, toys and other injection-molded articles having superior resistance to whitening by impact; and book covers and files having superior resistance to whitening by bending.

A random copolymer consisting essentially of propylene and 1-butene and an isotactic propylene resin have heretofore been known. Laminated or composite films or sheets prepared by laminating a copolymer of propylene and 1-butene onto a polypropylene film are also known (British patent specification No. 1,452,424 published on 13th Oct. 1976).

According to the technique suggested by British patent specification No. 1,452,424, a layer of a copolymer consisting essentially of 80 to 95% by weight (84.3 to 96.2 mole%) of propylene and 5 to 20% by weight of 1-butene is laminated on a polypropylene film. The British Patent states that the copolymer can be produced by the method disclosed in British Pat. No. 1,084,953. The British Pat. No. 1,084,953 discloses a copolymer consisting essentially of 5 to 50% by weight (6.5 to 57.2 mole%) of propylene and 50 to 90% by weight of 1-butene. However, this prior art reference does not at all disclose a blend of the copolymer and another resin, especially a propylene resin.

If an attempt is made to improve the low-temperature heat sealability and the shrinkability of a film or sheet of a random copolymer of propylene and 1-butene, the product inevitably has poor antiblocking property and poor scratch resistance. The present inventors have undertaken extensive work to remove this incompatibility. The work led to the discovery that a superior thermoplastic olefin resin composition having all these properties without incompatibility can be obtained by blending (i) a random copolymer consisting essentially of 55 to 85 mole%, preferably 60 to 82 mole% of propylene and 45 to 15 mole%, preferably 40 to 18 mole% of 1-butene and having a heat of fusion of 10 to 80 joules/g, preferably 20 to 70 joules/g, determined by differential thermal analysis using a differential scanning calorimeter (DSC) with (ii) an isotactic propylene resin which contains 0 to 10 mole% of another α-olefin and has a melting point of 135° to 165° C., preferably 140° to 165° C., and a melt index (230° C.) of 0.1 to 20, preferably 0.5 to 12, especially using the random copolymer (i) in a major proportion. It has also been found that the resin composition comprising a major proportion of the random copolymer (i) exhibits very useful improved effects as melt-shaped articles such as films or sheets and also as a laminated layer on a substrate of an isotactic propylene resin.

It has also been found that by using a major proportion of (ii) isotactic propylene resin, a superior thermoplastic olefin resin composition can be provided which eliminates the poor transparency, whitening by impact and whitening by bending which are inherently possessed by the propylene resin, while maintaining the various desirable properties of the propylene resin such as superior thermal stability, superior mechanical strength and hinge characteristics.

It is an object of this invention therefore to provide a thermoplastic olefin resin composition composed of a blend of a random copolymer consisting essentially of propylene and 1-butene and an isotactic propylene resin, which has these improved properties.

The above and other objects and advantages of this invention will become more apparent from the following description.

According to this invention, there is provided a thermoplastic olefin resin composition composed of a blend of (i) 5 to 95% by weight, based on the weight of the blend, of a random copolymer consisting essentially of 55 to 85 mole%, preferably 60 to 82 mole%, of propylene and 45 to 15 mole%, preferably 40 to 18 mole%, of 1-butene and having a heat of fusion of 10 to 80 joules/g, preferably 20 to 70 joules/g, determined by differential thermal analysis using a differential scanning calorimeter (DSC), and (ii) 5 to 95% by weight, based on the weight of the resin, of an isotactic propylene resin which contains up to 10 moles% of another α-olefin and has a melting point of 135° to 165° C., preferably 140° to 165° C., and a melt index (230° C.) of 0.1 to 20, preferably 0.5 to 12.

The random copolymer (i) preferably has a melt index of 0.1 to 40.

When the thermoplastic olefin resin composition of this invention comprises a major proportion of the random copolymer (i), the amount of the random copolymer (i) is 50 to 95% by weight, preferably 55 to 90% by weight, and the amount of the isotactic propylene resin (ii) is 5 to 50% by weight, preferably 10 to 45% by weight. When the thermoplastic olefin resin composition of this invention comprises a major proportion of the isotactic propylene resin (ii), the amount of the random copolymer (i) is 5 to 50% by weight, preferably 10 to 45% by weight, and the amount of the isotactic propylene resin is 50 to 95% by weight, preferably 55 to 90% by weight.

In the random copolymer (i) consisting essentially of propylene and 1-butene, the propylene content and the melting point of the resin have a substantial correlation with each other. For example, the melting point Tm(°C.) of a copolymer having a propylene content of y mole% is usually within the range of $1.4y-16 \leq Tm \leq 1.4y+24$, and in many cases within the range $1.4y-11 \leq Tm \leq 1.4y+19$. Hence, if a copolymer having a propylene content of more than 85 mole% is used, the transparent, low-temperature heat sealability and low-temperature shrinkability of the resulting composition become poor. On the other hand, if the propylene content is less than 55 mole%, the melting point of the copolymer becomes too low, and consequently, the film undergoes blocking, or spontaneously shrinks during storage. Furthermore, if the propylene content is too low, the uniform miscibility of the copolymer (i) with the isotactic propylene resin (ii) becomes poor, and an adverse effect is exerted on the transparency of the resulting composition.

For this reason, the random copolymer (i) consisting essentially of propylene and 1-butene used in this invention should have a propylene content of 55 to 85 mole %, preferably 60 to 82 mole%.

The random copolymer should have a heat of fusion of 10 to 80 joules/g, preferably 20 to 70 joules/g, determined by differential thermal analysis using a differential scanning calorimeter (DSC). The heat of fusion correlates with the degree of crystallization of the random copolymer resin (i). A random copolymer having a heat of fusion exceeding 80 joules/g has too low a content of 1-butene, or it is the one in which 1-butene is copolymerized to form a blocked copolymer. If such a copolymer is used, the resulting composition has poor transparency, low-temperature heat sealability and low-temperature shrinkability. On the other hand, a random copolymer having a heat of fusion of less than 10 joules/g has poor mechanical characteristics and thermal stability, and tends to undergo blocking and has a sticky feel. Even if such a resin is blended with the isotactic propylene resin (ii), the performance of the resulting composition cannot be improved to an extent feasible for practical purposes.

For this reason, the random copolymer (i) used in this invention should have a heat of fusion of 10 to 80 joules/g, preferably 20 to 70 joules/g.

In addition to meeting the conditions of propylene content and heat of fusion described above, the random copolymer (i) has a melt index of preferably 0.1 to 40, more preferably 1 to 10. If the melt index is less than 0.1, good products are difficult to obtain in film formation. On the other hand, if the melt index exceeds 40, the mechanical strength of the resulting film tends to decrease. It is preferred, therefore, for the random copolymer (i) to have a melt index within the above-specified range.

The heat of fusion of the random copolymer (i) of this invention consisting essentially of propylene and 1-butene is calculated by using as a baseline a straight line obtained by directly extrapolating to a lower temperature side the specific heat curve (preferably the specific heat curve at 160° C. to 240° C.) of a sample of the copolymer in a completely molten state which specific heat curve is determined by differential thermal analysis using a differential scanning calorimeter (DSC).

The melting point and heat of fusion are measured under the following measuring conditions. The sample is allowed to stand at 200° C. for 5 minutes, cooled to −40° C. at a rate of 10° C./min., and allowed to stand at −40° C. for 5 minutes. Then, the temperature is raised at a rate of 20° C./min, and the measurement is made at a temperature of from −40° C. to 200° C.

The isotactic propylene resin (ii) to be blended with the random copolymer (i) in this invention may contain up to 10 mole%, preferably up to 5 mole%, of another α-olefin such as ethylene or 1-butene. The isotactic propylene resin (ii) should have a melting point of 135° to 165° C., preferably 140° to 165° C., and a melt index, measured at 230° C., of 0.1 to 20, preferably 0.5 to 12. If the melting point of the resin (ii) is lower than 135° C. and/or its melt index exceeds 20, the olefin resin composition has low rigidity and poor mechanical characteristics. Furthermore, a film prepared from the olefin resin composition has poor slip property and undergoes blocking.

The random copolymer (i) can be obtained by random-copolymerizing propylene and 1-butene using a catalyst prepared from (a) a solid complex at least containing magnesium, titanium and halogen, (b) an organometallic compound of a metal of Groups 1 to 3 of the periodic table, preferably an organoaluminum compound, and (c) an electron donor. A part or the whole of the electron donor (c) may be fixed to a part or the whole of the solid complex (a). Or the electron donor (c) may be pre-contacted with the organometallic compound (b) prior to use. According to an especially preferred embodiment, a part of the electron donor (c) is fixed to the solid complex (a), and the remainder is added directly to the polymerization system or pre-contacted with the organometallic compound (b). In this case, the electron donor fixed to the solid complex (a) may be the same as or different from the electron donor directly added to the polymerization system or pre-contacted with the organometallic compound (b).

The solid complex (a) can be produced by various known methods such as those disclosed in Japanese Patent Publications Nos. 36786/77 (published on Sept. 17, 1977), and 36913/77 (published on Sept. 17, 1977), Japanese Laid-Open Patent Publications Nos. 126590/75 (published on Oct. 4, 1975), 28189/76 (published on Mar. 9, 1976), 92885/76 (published on Aug. 14, 1976), 127185/76 (published on Nov. 5, 1976), 136625/76 (published on Nov. 26, 1976), and 87489/77 (published on July, 21, 1977), and West German Laid-Open Patents Nos. 2643143 (published on June 2, 1977), 2656055 (published on June 23, 1977) and 2708588 (published on Sept. 8, 1977).

A copolymer prepared from the above monomers using a titanium trichloride-type catalyst without using the solid complex (a) has a higher degree of crystallization even when its propylene content is the same. Since the comonomer to be introduced into the copolymer does not take a random configuration, the copolymer has poor transparency and does not suit the purpose of the present invention. On the other hand, a copolymer prepared from these monomers using a vanadium-type catalyst scarcely shows a heat of fusion. Since such a copolymer has poor mechanical characteristics and heat distortion, it cannot be used in the present invention.

The method of copolymerization is well known. Propylene and 1-butene can be copolymerized either in the liquid phase or in the gaseous phase. Preferably, the copolymerization is carried out in the liquid phase under conditions such that the resulting copolymer dissolves in it. The liquid-phase copolymerization can also be performed in an inert solvent, for example an aliphatic hydrocarbon such as hexane, heptane or kerosene, an alicyclic hydrocarbon such as cyclohexane, or an aromatic hydrocarbon such as benzene, toluene or xylene. Alternatively, the olefin itself may be used as a reaction medium.

In the case of the liquid-phase copolymerization, the concentration of the solid complex (a) in the polymerization system is preferably 0.001 to 0.5 millimole as titanium atom per liter of liquid phase, and the concentration of the organometallic compound (b) is preferably 0.1 to 50 millimoles as metal atom per liter of liquid phase. The amount of the organometallic compound (b) is chosen such that the ratio of the metal atom to the titanium atom of component (1) becomes 1:1 to 1000:1, preferably 1:1 to 200:1. The amount of the electron donor (c) is 0.001 to 1 mole, preferably 0.01 to 0.9 mole, per metal atom of the organometallic compound.

The copolymerization can be performed in the same way as in the polymerization of an olefin with an ordinary Ziegler catalyst. The copolymerization temperature is usually 30° to 140° C., preferably 50° to 120° C. Preferably, the polymerization is carried out under an elevated pressure, usually from atmospheric pressure to 50 kg/cm$^2$, preferably about 2 to 20 kg/cm$^2$. The ratio of propylene to 1-butene to produce copolymers having a propylene content of 40 to 90 mole%, which differs according to the polymerization pressure, is usually 85:15 to 10:90.

The molecular weight of the copolymer can be controlled to some extent by varying the polymerization conditions such as the polymerization temperature and the proportions of the catalyst ingredients. The addition of hydrogen to the polymerization system is most effective.

All random copolymers which have propylene contents and heats of fusion and preferably melt indexes, which are specified hereinabove, can be used. Especially preferred copolymers are random copolymers consisting essentially of propylene and 1-butene which can be produced by the process described in detail in U.S. patent application Ser. No. 861,894 covering the invention of other researchers of the Applicant's company.

The thermoplastic olefin resin composition of this invention can be shaped into various types of melt-shaped articles having superior properties.

The random copolymer (i) used as an ingredient of the thermoplastic olefin resin composition of this invention can be used as a heat-sealable laminate film or sheet having the following improved properties by being formed into a laminated layer on at least one surface of a substrate of isotatic propylene resin.

(1) It can be heat-sealed at a considerably lower temperature than the substrate.

(2) It has a high heat-seal strength.

(3) It has a good adhesion to the substrate.

(4) It has equal or higher transparency to or than the substrate.

(5) It does not undergo blocking during storage.

(6) It does not stick to bag-making and packing devices.

(7) It has good resistance to scratch.

In the laminated or composite film or sheet described above, the isotactic propylene resin layer as a substrate may be stretched uniaxially or biaxially. Preferably, the isotactic propylene resin layer of the composite film has a thickness of 5 to 200 microns, more preferably 10 to 60 microns, and the thickness of the blend of the propylene/1-butene random copolymer (i) and the isotactic propylene resin (ii) is 2 to 100 microns, preferably 3 to 30 microns.

The laminated or composite film or sheet can be prepared by various methods among which are:

(1) A method which comprises co-extruding and laminating the thermoplastic olefin resin composed of a blend of (i) random copolymer and (ii) isotactic propylene resin and crystalline polypropylene, and if required, stretching the laminate in the longitudinal and transverse directions either simultaneously or at differnt times.

(2) A method which comprises melt-extruding the thermoplastic olefin resin composition on a crystalline polypropylene film as a substrate.

(3) A method which comprises laminating a substrate layer of crystalline polypropylene film and a film of the thermoplastic olefin resin composition by an adhesive.

The laminated or composite olefin resin film or sheet in accordance with this invention has good transparency and excellent low-temperature heat-sealability. The adhesion between the substrate layer and the laminated layer of the thermoplastic olefin resin composition is strong, and the laminated film or sheet also has superior scratch resistance and anti-blocking property.

The substrate layer of isotactic propylene resin having a laminated layer of the thermoplastic olefin resin composition of this invention may be the same polymer as the ingredient (ii) of the olefin resin composition of this invention. It is especially preferred however to use a substrate layer of isotactic propylene resin having a density of 0.89 to 0.92 g/cm$^3$, a melt index (at 230° C.) of 0.1 to 10, and a boiling n-heptane-insoluble content of 75 to 98%.

The thermoplastic olefin resin composition of this invention may contain various additives used customarily in plastics fabrication. Examples of such additives are heat stabilizers, ultraviolet stabilizers, nucleating agents, slip agents, antistatic agents, antiblocking agents, antihaze agents, pigments and dyes.

Specific examples include heat stabilizers such as 2,6-ditert-butyl p-cresol, tetrakis[methylene(3,5-ditert-butyl-4-hydroxy hydrocinnamate]methane, n-octadecyl-$\beta$-(4'-hydroxy-3,5'-ditert-butyl phenyl) propionate, 1,3,5-trimethyl-2,4,6-tris(3,5-ditert-butyl 4-hydroxybenzyl)benzene, dilauryl thiodipropionate, trisnonylphenyl phosphite, 1,1',3-tris(2-methyl-4-hydroxy-5-tert-butylphenyl)butane and $\alpha$-tocopherol; ultraviolet stabilizers such as 2-(2'-hydroxy-3,5'-ditert-butylphenyl)5-chlorobenzotriazole, [2,2'-thiobis-(4-tertiary octylphenolate)] n-butylamine nickel, 2-hydroxy-4-n-octoxybenzophenone, nickel dibutyl dithiocarbamate, [bis-(3,5-ditert-butyl 4-hydroxybenzyl monoethyl phosphate)]nickel salt, 4-benzoloxy-2,2,6,6-tetramethylpiperidine and bis(2,2,6,6-tetramethyl-4-piperidyl) sebacate; nucleating agents such as silica gel, aluminum hydroxy di-p-tert-butyl benzoate, dibenzylidine sorbitol, aluminum benzoate, talc, sodium adipate and zinc phthalate; slip agents such as oleinamide, erucamide, ethylenebis-oleylamide and ethylene-bis-stearylamide; antistatic agents such as stearyl diethanolamine monostearate, lauryl diethanolamine monocaprylate, lauryl diethanolamine and stearyl monoglyceride; antiblocking agents such as silica gel and silica; antihaze agents such as stearyl monoglyceride, propylene glycol monooleate and diglycerin nomooleate; and coloring agents (pigments or dyes) such as titanium white, titanium yellow, yellow iron oxide, zinc ferrite pigment, red iron oxide, ultramarine, cobalt blue, chromium oxide green, chromium titanium yellow, titanium green, phthalocyanine blue, phthalocyanine green, iso-indolinone yellow and quinacridone red.

The amount of these addtives can be chosen properly, and are, for example, about 0.01 to about 0.5% by weight for the heat stabilizers; about 0.01 to about 0.5% by weight for the ultraviolet stabilizers; about 0.01 to about 0.5% by weight for the nucleating agents; about 0.01 to about 1.0% by weight for the slip agents; about 0.01 to about 0.3% by weight for the antistatic agents; about 0.01 about 0.3% by weight for the antiblocking agents; about 0.1 to about 5.0% by weight for the antihaze agents; and about 0.1 to about 1.0% by weight for the coloring agents, all based on the total weight of the resins (i) and (ii).

In the laminated olefin resin film or sheet in accordance with this invention, the substrate layer of isotactic propylene resin may contain various additives.

Specific examples of these additives include stabilizers such as 2,6-di-tert-butyl-p-cresol, tetrakis [methylene-3-(3,5-di-tert-butyl-4-hydroxyphenyl)propionate] methane, 4,4'-butylidenebis(6-tert-butyl-m-cresol), tocopherols, ascorbic acid, dilauryl thiodipropionate, phosphoric acid-type stabilizing compounds, fatty acid monoglycerides, N,N-(bis-2-hydroxyethyl)alkylamine, 2-(2'-hydroxy-3',5'-di-tert-butylphenyl)-5-chlorobenzotriazole, and calcium stearate; ultraviolet absorbers such as 2-hydroxy-4-n-octyl benzophenone, 4-dodecyloxy-2-hydroxybenzophenone, 2-(2'-hydroxy-3',5'-ditert-butyl phenyl) benzotriazole, 2-(2'-hydroxy-3'-tert-butyl-5'-methyl phenyl) benzotriazole, p-octylphenylsalicylate, carboxyphenyl salicylate, dodecyl salicylate, 2-ethylhexy-2-cyano-3,3-diphenyl acrylate, resorcinol monobenzoate, and [2,2'-thiobis(4-tert-octyl phenolate)] n-butylamine nickel; antistatic agents such as sorbitan fatty acid monoesters, pentaerythritol fatty acid esters, polyethylene glycol, polyethylene glycol monoethers, polyethylene glycol fatty acid monoesters, betaine derivatives, hydroxyethyl imidazoline sulfuric acid ester, fatty acid salts, sulfuric acid ester salts of higher fatty acid oils and aliphatic amines; lubricants such as liquid paraffin, natural paraffin, microwax, synthetic paraffins, polyethylene wax, stearic acid, lauric acid, stearamide, palmitamide, methylenebis stearmide, ethylenebis stearamide, oleinamide, cetylamide, hardened castor oil, butyl stearate, ethylene glycol monostearate, cetyl alcohol, stearyl alcohol and metal soaps; pigments such as cadmium orange, red iron oxide, cadmium red, cadmium yellow, quinacridone red, ultramarine, cobalt blue, phthalocyanine blue, phthalocyanine green, chrome green, aluminum powder, titanium oxide, zinc oxide and carbon black; and organic or inorganic fillers such as magnesium oxide, magnesium hydroxide, alumina, aluminum hydroxide, silica hydrotalcite, talc, clay, gypsum, glass fibers, titania, calcium carbonate, carbon black, petroleum resins, polybutene, waxes, and synthetic or natural rubbers.

The amounts of these additives can be chosen properly, and are, for example about 0.01 to about 5% by weight for the stabilizers; about 0.01 to about 1% by weight for the ultraviolet absorbers; about 0.01 to about 10% by weight for the antistatic agents; about 0.05 to about 5% by weight for the lubricants; about 0.05 to about 10% by weight for the pigments; and up to about 150% by weight for the inorganic or organic fillers, all based on the weight of the copolymer or on the total weight of the copolymer and the other resin.

The thermoplastic olefin resin composition of this invention may be in the form of a blend which is rich in the random copolymer (i) or a blend which is rich in the isotactic propylene resin (ii).

The former has improved antiblocking property and mechanical strength in addition to superior transparency, superior low-temperature heat sealability and good low-temperature shrinkability. Because of these improved properties, the resin composition of this type is very useful as various melt-shaped articles such as shrinkable packaging films or sheets, protecting films or sheets, and textile and general-purpose packaging films or sheets.

The latter type of composition has markedly improved transparency, resistance to whitening by impact and resistance to whitening by bending in addition to superior thermal stability, superior mechanical strength and hinge characteristics. Because of these improved properties, this resin is very useful as various melt-shaped articles, various containers such as containers for edible oils and seasonings, containers for transporting liquids and containers for liquid detergents; blister packs, skin packs and similar vacuum-formed packs; tapes having superior optical characteristics, general-purpose packaging films or sheets, shrinkable packaging films or sheets; injection-molded articles having superior resistance to whitening by impact such as battery cases and toys; and book covers and files having superior resistance to whitening by bending.

The method for preparing the thermoplastic olefin resin of this invention can be freely chosen, and any means by which the random copolymer (i) can be mixed homogeneously with the isotactic propylene resin (ii) can be used. For example, the ingredients are mixed by a V-type blender, tumbler mixer, Henschel mixer, etc., and then kneaded by an extruder, kneader, mixing rolls, Banbury mixer, etc. It is sufficient that mixing is performed under conditions which can cause intimate mixing of the random copolymer (i) and the isotactic propylene resin (ii) in the molten state. In mixing or prior to the formation of shaped products, additives of the types exemplified hereinabove can be incorporated. Any known melt-shaping means can be used to shape the composition of this invention.

The following Examples illustrate the present invention in more detail. Various properties are measured by the following methods.

(1) Tensile characteristics
  ASTM-D-882, rate of pulling 50 mm/min.
(2) Degree of haze
  ASTM-D-1003
(3) Antiblocking property
  ASTM-D-1894
(4) Heat-seal adhesion strength A film sample is superimposed on itself, and heat-sealed at a temperature of 90, 100, 110, 120, 130, 140, and 150° C. respectively under a pressure of 2 kg/cm$^2$ for 1 second using a seal bar width of 5 mm, and then allowed to cool. A test piece with a width of 15 mm is cut out from the sample, and the heat-sealed portion is peeled off at a cross head speed of 200 mm/min. The strength at the time of peeling is measured.

(5) Scratch resistance

A bleached kraft paper with an unsized surface is superimposed on the heat-sealed surface of the film.

Using an iron block having a weight of 500 g as a load, the kraft paper is rubbed once against the film at a speed of 500 mm/min, and the occurrence of scars is visually evaluated.

(6) Gloss
  ASTM-D-2457

(7) Resistance to whitening by bending

A test piece with a size of 6 cm×1.25 cm is bended 180° at its center, and returned to the original state. The presence of whitening is evaluated visually on the following scale.
  Good: no whitening is observed.
  Fair: slight whitening is observed.
  Poor: marked whitening is observed.

(8) Whitening by ball falling

A steel ball weighing 520 g is let fall from a height of 50 cm, and the presence of whitening is evaluated visually on the following scale.
  Good: no whitening is observed.
  Fair: slight whitening is observed.
  Poor: marked whitening is observed.

(9) Heat distortion temperature
  ASTM-D-648

EXAMPLES 1 TO 3 AND COMPARATIVE

EXAMPLES 1 TO 3

Preparation of a random copolymer (i)

A 20-liter stainless steel polymerization vessel equipped with stirring vanes was charged with 0.01 millimole/liter, as titanium, of a catalyst component (a) (which had been prepared by ball-milling 200 g of anhydrous magnesium chloride, 46 ml of ethyl benzoate and 30 ml of methyl polysiloxane in a nitrogen atmosphere, then suspended in titanium tetrachloride, and filtered), 1.0 millimole/liter, as a concentration in the polymerization vessel, of (b) triethyl aluminum, and 0.33 millimole/liter, as a concentration in the polymerization vessel, of methyl p-toluate as an electron donor (c). As a polymerization solvent, n-heptane was fed into the polymerization vessel, and a gaseous mixture of 68 mole% of propylene and 32 mole% of 1-butene was fed into it at a rate of 4 kiloliters/hour and copolymerized at 70° C.

The resulting propylene/1-butene random copolymer had a propylene contact, as measured by nuclear magnetic resonance spectroscopy, of 71.0 mole;, a melting point of 110° C., a heat of fusion of 50 joules/g and a melt index of 7.0.

Preparation of a composition rich in the random copolymer (i)

Pellets of polypropylene (to be referred to as PP) having a melt index, measured at 230° C., of 0.5, a melting point of 165° C., a boiling n-heptane insoluble content of 95% by weight and a density of 0.91 g/cm³ and pellets of the resulting propylene/1-butene random copolymer (to be abbreviated as PBC) obtained above were mixed at the mixing ratios shown in Table 1 for 10 minutes using a tumbler blender. The mixture was formed into a film having a thickness of 30 microns by a 40 mm φ T-die forming machine while maintaining the temperature of the resin at 230° C.

The film was evaluated, and the results are shown in Table 1.

Table 1

| Examples (Ex.) and Comparative Examples (CEx.) | | Ex. 1 | Ex. 2 | Ex. 3 | CEx. 1 | CEx. 2 | CEx. 3 |
| --- | --- | --- | --- | --- | --- | --- | --- |
| Composition (parts by weight) | (i) PBC | 90 | 75 | 60 | 100 | 97 | 0 |
| | (ii) PP | 10 | 25 | 40 | 0 | 3 | 100 |
| Degree of haze (%) | | 0.4 | 0.5 | 0.5 | 0.4 | 0.4 | 6.8 |
| Antiblocking property (g/15 mm) | | 6.7 | 5.1 | 4.3 | 9.6 | 9.0 | 0.1 |
| Heat-seal adhesion strength (g/15 mm) | 90° C. | 310 | 90 | — | 700 | 500 | — |
| | 100° C. | 530 | 190 | 40 | 840 | 760 | — |
| | 110° C. | 670 | 710 | 100 | 900 | 800 | — |
| | 120° C. | 710 | 700 | 220 | 930 | 850 | — |
| | 130° C. | 850 | 820 | 1060 | 1010 | 950 | 40 |
| | 140° C. | 1010 | 870 | 1200 | 980 | 1000 | 80 |
| | 150° C. | 1020 | 900 | 1210 | 1020 | 1020 | 290 |
| Tensile characteristics | Tensile modulus (kg/cm²) | 3700 | 4000 | 4720 | 3150 | 3190 | 11900 |
| | Stress at yield point (kg/cm²) | 135 | 140 | 145 | 126 | 129 | 242 |
| | Tensile strength at break (kg/cm²) | 450 | 465 | 471 | 440 | 440 | 495 |
| | Elongation at break (%) | 600 | 620 | 620 | 610 | 610 | 560 |

EXAMPLES 4 TO 6 AND COMPARATIVE EXAMPLES 4 TO 6

Example 2 was repeated except that a propylene-/ethylene random copolymer (to be abbreviated as PEC) having a melt index, measured at 230° C., of 7, a melting point of 142° C., a density of 0.91 g/cm³, a boiling n-heptane insoluble content of 30% by weight and an ethylene content of 5.5 mole%, or polyethylene (to be abbreviated as PE) having a melt index, measured at 190° C., of 1.0, a melting point of 131° C. and a density of 0.955 g/cm³ was used instead of PP.

The results are shown in Table 2.

Table 2

| Examples (Ex.) or Comparative Examples (CEx.) | | Ex. 4 | Ex. 5 | Ex. 6 | CEx. 4 | CEx. 5 | CEx. 6 |
| --- | --- | --- | --- | --- | --- | --- | --- |
| Composition (parts by weight) | (i)PBC | 90 | 75 | 60 | 97 | 0 | 75 |
| | (ii) PEC | 10 | 25 | 40 | 3 | 100 | 25 (PE) |
| Degree of haze (%) | | 0.4 | 0.4 | 0.4 | 0.4 | 0.8 | 8.0 |
| Antiblocking property (g/15 mm) | | 7.1 | 5.9 | 4.8 | 9.4 | 1.6 | 5.6 |
| | 90° C. | 450 | — | — | 630 | — | — |
| | 100° C. | 610 | 40 | — | 870 | — | — |
| | 110° C. | 850 | 200 | 40 | 870 | — | — |

Table 2-continued

| Examples (Ex.) or Comparative Examples (CEx.) | | | Ex. 4 | Ex. 5 | Ex. 6 | CEx. 4 | CEx. 5 | CEx. 6 |
|---|---|---|---|---|---|---|---|---|
| | Heat-seal adhesion strength (g/15 mm) | 120° C. | 900 | 850 | 800 | 920 | — | 70 |
| | | 130° C. | 950 | 1010 | 940 | 980 | 490 | 500 |
| | | 140° C. | 1020 | 1020 | 1010 | 1030 | 1260 | 1090 |
| | | 150° C. | 1100 | 1100 | 1150 | 1160 | 1370 | 1300 |
| Tensile characteristics | Tensile modulus (kg/cm$^2$) | | 3200 | 3700 | 4150 | 3150 | 7180 | 7000 |
| | Stress at yield point (kg/cm$^2$) | | 131 | 139 | 143 | 129 | 194 | 130 |
| | Tensile strength at break (kg/cm$^2$) | | 420 | 465 | 471 | 420 | 461 | 440 |
| | Elongation at break (%) | | 610 | 600 | 620 | 620 | 590 | 600 |

EXAMPLES 7 AND 8 AND COMPARATIVE EXAMPLES 7 AND 8

Examples 2 was repeated except that PBC shown in Table 3 which had been obtained by varying the proportions of propylene and 1-butene was used instead of PBC used in Example 2. The results of evaluations are shown in Table 3.

Table 3

| Examples (Ex.) and Comparative Examples (CEx.) | | | Ex. 7 | Ex. 8 | CEx. 7 | CEx. 8 |
|---|---|---|---|---|---|---|
| PBC | Propylene content (mole %) | | 60.0 | 82.0 | 49.0 | 93.0 |
| | Heat of fusion (joules/g) | | 34 | 71 | 20 | 97 |
| Degree of haze (%) | | | 0.4 | 0.5 | 1.0 | 1.0 |
| Antiblocking property (kg/cm$^2$) | | | 5.9 | 3.8 | 10.4 | 1.6 |
| Heat-seal adhesion strength (g/15 mm) | | 90° C. | 600 | — | 510 | — |
| | | 100° C. | 720 | 50 | 690 | — |
| | | 110° C. | 780 | 80 | 700 | — |
| | | 120° C. | 800 | 1040 | 790 | 40 |
| | | 130° C. | 830 | 1140 | 800 | 200 |
| | | 140° C. | 820 | 1210 | 810 | 540 |
| | | 150° C. | 890 | 1260 | 800 | 800 |
| Tensile characteristics | Tensile modulus (kg/cm$^2$) | | 3050 | 4610 | 3000 | 7250 |
| | Stress at yield point (kg/cm$^2$) | | 130 | 138 | 127 | 193 |
| | Tensile strength at break (kg/cm$^2$) | | 425 | 440 | 422 | 484 |
| | Elongation at break (%) | | 610 | 510 | 620 | 540 |

EXAMPLES 9 TO 11 AND COMPARATIVE EXAMPLE 9

Preparation of a Composition Rich in the Isotactic Polypropylene (ii)

PP and PBC used in Example 1 were mixed for 10 minutes at the ratios shown in Table 4 by a tumbler blender and formed into a sheet having a thickness of 1 mm by a 40 mm φ T-die forming machine while maintaining the temperature of the resin at 230° C. The results of evaluating the resulting sheet are shown in Table 4.

Table 4

| Example (Ex.) and Comparative Example (CEx.) | | Ex. 9 | Ex. 10 | Ex. 11 | CEx. 9 |
|---|---|---|---|---|---|
| Composition (parts by weight) | (i) PBC | 10 | 20 | 40 | 0 |
| | (ii) PP | 90 | 80 | 60 | 100 |
| Tensile characteristics | Tensile modulus (kg/cm$^2$) | | | | |
| | Longitudinal | 1400 | 1100 | 830 | 1640 |
| | Transverse | 1200 | 1020 | 790 | 1420 |
| | Stress at yield point (kg/cm$^2$) | | | | |
| | Longitudinal | 300 | 290 | 250 | 320 |
| | Transverse | 295 | 285 | 250 | 310 |
| | Tensile strength at break (kg/cm$^2$) | | | | |
| | Longitudinal | 460 | 460 | 460 | 460 |
| | Transverse | 450 | 450 | 460 | 450 |
| | Elongation at break (%) | | | | |
| | Longitudinal | 500 | 510 | 510 | 460 |
| | Transverse | 510 | 520 | 530 | 500 |
| Optical properties | Degree of haze (%) | 40 | 30 | 23 | 60 |
| | Gloss (%) | 68 | 73 | 77 | 64 |
| Resistance to whitening by bending | | Good | Good | Good | Poor |
| Resistance to whitening by ball falling | | Good | Good | Good | Poor |
| Heat distortion temperature (°C.) | | 125 | 120 | 100 | 130 |

EXAMPLES 12 AND 13 AND COMPARATIVE EXAMPLES 10 AND 11

Example 10 was repeated except that PBCs used in Examples 7 and 8 and Comparative Examples 7 and 8 were used respectively. The results of evaluation are shown in Table 5. Table 5 also contains the results of Example 10 for easy reference.

Table 5

| Example (Ex.) and Comparative Example (CEx.) | | Ex. 12 | Ex. 10 | Ex. 13 | CEx. 10 | CEx. 11 |
|---|---|---|---|---|---|---|
| PBC | Propylene content (mole%) | 60.0 | 71.0 | 82.0 | 49.0 | 93.0 |
| | Heat of fusion (joules/g) | 34 | 50 | 71 | 20 | 97 |
| | Tensile modulus (kg/cm$^2$) | | | | | |
| | Longitudinal | 1030 | 1100 | 1180 | 1030 | 1400 |
| | Transverse | 1000 | 1020 | 1100 | 980 | 1300 |
| | Stress at yield point (kg/cm$^2$) | | | | | |
| | Longitudinal | 280 | 290 | 300 | 250 | 300 |
| Tensile | Transverse | 280 | 285 | 290 | 250 | 290 |
| character- | Tensile strength at break (kg/cm$^2$) | | | | | |
| istics | Longitudinal | 450 | 460 | 470 | 410 | 470 |
| | Transverse | 450 | 450 | 460 | 410 | 470 |
| | Elongation at break (%) | | | | | |
| | Longitudinal | 500 | 510 | 510 | 520 | 500 |
| | Transverse | 500 | 520 | 530 | 530 | 500 |
| Optical | Degree of haze (%) | 25 | 30 | 32 | 27 | 35 |
| prop- | Gloss (%) | 70 | 73 | 73 | 68 | 70 |
| erties | | | | | | |
| Resistance to whitening by bending | | Good | Good | Good | Good | Fair |
| Resistance to whitening by ball falling | | Good | Good | Fair | Good | Poor |
| Heat distortion temperature (°C.) | | 117 | 120 | 122 | 114 | 127 |

COMPARATIVE EXAMPLES 12 AND 13

Example 10 was repeated except that an ethylene/1-butene random copolymer (to be abbreviated as EBC) or an ethylene/propylene random copolymer (to be abbreviated as EPC) was used instead of PBC.

EBC had a melt index, measured at 190° C., of 4, an ethylene content of 90 mole %, a density of 0.885 g/cm$^3$, a melting point of 79° C. and a heat of fusion of 35 joules/g.

EPC had a melt index, measured at 190° C., of 7.0, an ethylene content of 80 mole %, and a heat of fusion of less than 5 joules/g.

The results are shown in Table 6. The results of Example 10 are also shown in Table 6 for easy reference.

Table 6

| Example (Ex.) and Comparative Example (CEx.) | | Ex. 10 | CEx. 12 | CEx. 13 |
|---|---|---|---|---|
| Composition | PP | 80 | 80 | 80 |
| (parts by weight) | PBC | 20 | — | — |
| | EBC | — | 20 | — |
| | EPC | — | — | 20 |
| | Tensile modulus (kg/cm$^2$) | | | |
| | Longitudinal | 1100 | 1070 | 1060 |
| | Transverse | 1020 | 980 | 990 |
| | Stress at yield point (kg/cm$^2$) | | | |
| | Longitudinal | 290 | 290 | 270 |
| Tensile | Transverse | 280 | 270 | 250 |
| character- | Tensile strength at break (kg/cm$^2$) | | | |
| ristics | Longitudinal | 470 | 470 | 370 |
| | Transverse | 470 | 280 | 270 |
| | Elongation at break (%) | | | |
| | Longitudinal | 510 | 510 | 440 |
| | Transverse | 530 | 340 | 330 |
| Optical | Degree of haze (%) | 30 | 40 | 50 |
| prop- | Gloss (%) | 73 | 69 | 69 |
| erties | | | | |
| Resistance to whitening by bending | | Good | Poor | Poor |
| Resistance to whitening by ball falling | | Good | Poor | Fair |
| Heat distortion temperature (°C.) | | 120 | 117 | 114 |

EXAMPLES 14 TO 16 AND COMPARATIVE EXAMPLES 14 AND 15

PBC and PP used in Example 1 were mixed at the mixing ratios shown in Table 7 by means of a tumbling blender for 10 minutes, and granulated by a 40 mmφ extruder at 230° C. The resulting pellets were melted in an extruder, and fed into a die for two-layer films while maintaining the temperature of the resin at 230° C. Polypropylene having a boiling n-heptane insoluble content of 96% and a melt index of 1.5 was melted in a separate extruder, and fed into the same die while maintaining the temperature of the resin at 240° C. A composite film was obtained in which the thickness of the polypropylene substrate layer was 40 microns, and the thickness of the heat sealed layer was 10 microns.

The results of evaluations are shown in Table 7.

Table 7

| Example (Ex.) and Comparative Example (CEx.) | | Ex. 14 | Ex. 15 | Ex. 16 | CEx. 14 | CEx. 15 |
|---|---|---|---|---|---|---|
| Composition | PBC | 90 | 75 | 60 | 100 | 0 |
| (parts by weight) | PP | 10 | 25 | 40 | 0 | 100 |
| Degree of haze (%) | | 3.8 | 4.0 | 4.0 | 3.8 | 6.8 |
| Antiblocking property (g/15mm) | | 7.8 | 6.2 | 4.3 | 1.9 | 0.1 |
| Scratch resistance | | Good | Good | Good | Fair | Good |
| | 90° C. | 580 | 180 | — | 760 | — |
| | 100° C. | 790 | 420 | 70 | 770 | — |
| Heat-seal adhesion | 110° C. | 820 | 770 | 220 | 760 | — |
| strength (g/15 mm) | 120° C. | 850 | 860 | 500 | 800 | — |
| | 130° C. | 840 | 910 | 810 | 810 | 110 |
| | 140° C. | 890 | 880 | 920 | 760 | 290 |
| | 150° C. | 870 | 900 | 940 | 750 | 750 |

EXAMPLES 17 TO 19 AND COMPARATIVE EXAMPLE 16

The procedure of Examples 15 and 16 was repeated except that a propylene/1-butene random copolymer (to be referred to as PBC-2) obtained by varying the mixing ratio of a propylene/1-butene gaseous mixture and having a propylene content of 80.3 mole %, a melting point of 124° C., a heat of fusion of 68 joules/g and a melt index of 7.0 was used instead of PBC. The results are shown in Table 8.

Table 8

| Example (Ex.) and Comparative Example (CEx.) | | Ex. 17 | Ex. 18 | Ex. 19 | CEx. 16 |
|---|---|---|---|---|---|
| Composition | PBC-2 | 90 | 75 | 60 | 100 |
| (parts by weight) | PP | 10 | 25 | 40 | 0 |
| Degree of haze (%) | | 3.6 | 3.7 | 3.9 | 3.4 |
| Antiblocking property (g/15 mm) | | 3.0 | 2.2 | 1.5 | 3.9 |
| Scratch resistance | | Excellent | Excellent | Excellent | Good |
| | 90° C. | 50 | — | — | 130 |
| | 100° C. | 280 | 60 | — | 380 |
| Heat-seal adhesion | 110° C. | 720 | 210 | 50 | 820 |
| strength (g/15 mm) | 120° C. | 1020 | 740 | 180 | 1060 |
| | 130° C. | 1130 | 1050 | 460 | 1170 |
| | 140° C. | 1170 | 1180 | 1010 | 1200 |
| | 150° C. | 1280 | 1250 | 1200 | 1240 |

What we claim is:

1. A laminated olefin resin film or sheet comprising a substrate of an isotactic propylene resin and formed on at least one surface thereof, a laminated layer of a thermoplastic olefin resin composition, said composition being composed of a blend of
   (i) 50 to 95% by weight, based on the total weight of the blend, of a random copolymer consisting essentially of 55 to 85 mole % of propylene and 45 to 15 mole % of 1-butene and having a heat of fusion of 10 to 80 joules/g determined by differential thermal analysis using a differential scanning calorimeter, and
   (ii) 5 to 50% by weight, based on the total weight of the blend, of an isotactic propylene resin containing 0 to 10 mole % of another α-olefin and having a melting point of 135° to 165° C. and a melt index, measured at 230° C., of 0.1 to 20.

2. The film or sheet of claim 1 wherein the substrate is a biaxially stretched substrate.

3. The laminated olefin resin composition of claim 1, wherein the random copolymer has a melt index of 0.1 to 40.

4. The laminated olefin resin composition of claim 1, wherein the random copolymer has a propylene content of 60 to 82 mole %.

5. The laminated olefin resin composition of claim 1, wherein the random copolymer has a heat of fusion of 20 to 70 joules/g.

* * * * *